No. 772,659. PATENTED OCT. 18, 1904.
J. IRVINE.
FASTENING FOR PACKING CASES OR THE LIKE.
APPLICATION FILED APR. 14, 1904.
NO MODEL.
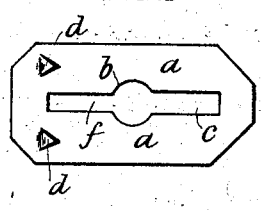
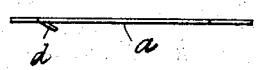
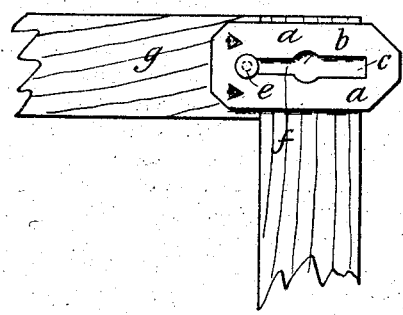
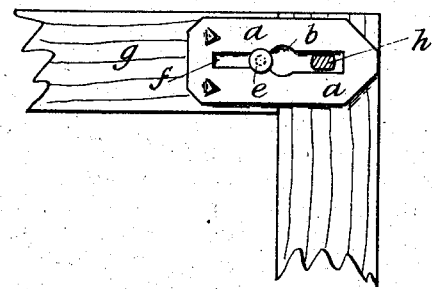
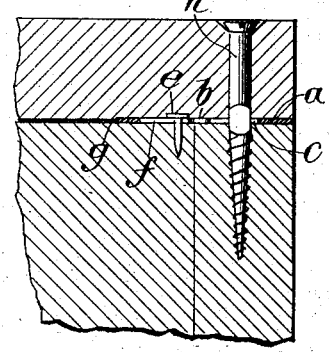

No. 772,659.

Patented October 18, 1904.

UNITED STATES PATENT OFFICE.

JAMES IRVINE, OF NAPIER, NEW ZEALAND.

FASTENING FOR PACKING-CASES OR THE LIKE.

SPECIFICATION forming part of Letters Patent No. 772,659, dated October 18, 1904.

Application filed April 14, 1904. Serial No. 203,206. (No model.)

*To all whom it may concern:*

Be it known that I, JAMES IRVINE, a subject of the King of Great Britain, residing at Napier, Hawke's Bay, in the Colony of New Zealand, have invented new and useful Improvements in Fastenings for Packing-Cases or the Like; and I do hereby declare the following to be a full, clear, and exact description of the same.

This invention has been devised in order to provide means whereby packing-cases may be prevented from being opened or tampered with without showing that such has been done.

The invention consists in the use of a small metallic plate or disk, a number of which are inserted between the joints of the case and through each one of which the screws fastening the sides are driven. These plates are provided with a hole to allow of the screw passing through and with a slot running from the edge of the hole, the sides of which are made to engage with a squared portion of the screw when such screw has been driven home, so as to prevent the screw being turned to draw it from its place.

In the accompanying drawings, Figure 1 is a plan of one of the plates. Fig. 2 is a side elevation of the same. Fig. 3 shows a portion of a case-joint with the plate in the position to allow of the screw being driven home. Fig. 4 is a similar view, but with the plate in the final position assumed after the screw has been driven home. Fig. 5 is a sectional view showing the screw in locked position.

$a$ is the plate, which is formed with a hole $b$ in its center and with a square-edged slot $c$, extending longitudinally from one side of the hole $b$. The plate is also formed with sharpened barbs $d$, projecting downward from its under surface.

Referring to Figs. 3 and 4, in use the plate is laid on the face $g$ of one member of the joint to be made, so that the hole $b$ will be over the point into which the screw has to be passed. If desired, the plate may then be secured in this position by means of a short flat-headed nail $e$, driven through a slot $f$ in the plate, extending from the opposite side of the hole $b$ to the slot $c$ and into the face $g$. The other member of the joint is then laid on the face $g$ and secured thereto by means of the screw $h$ driven through it, through the hole $b$, and into the face $g$. The screw is formed with squared sides at a point in its length distant from the head approximately the same as the thickness of the board laid on the face $g$, so that when the screw has been driven home the squared portion will be in a line with the plate $a$. The projecting end of the plate $a$ is then driven in, so that its end will be flush with the edge of the joint, as shown in Fig. 4. The slot $c$ will thus pass onto the squared portion of the screw $g$, so that such screw will be prevented from turning. At the same time the barbs $d$ will bite into the face $g$, so as to prevent the plate being drawn out again. Thus to break the joint again the wood will have to be broken or split, thereby indicating that the joint has been broken.

Although the plate is more particularly applicable for use with screws which have to be turned in order to be drawn, it may with equal effect be used with nails that are barbed or formed with square portions, the barbs or the shoulders engaging with the edges of the slot $c$ after they have been driven home. In such a case the nail-fastening $e$ would serve to prevent the plate being drawn up with the jointing-nail and the top portion of the joint.

What I claim as my invention, and desire to secure by Letters Patent, is—

1. In means for securing the joints of packing-cases and the like, a plate adapted to be inserted between the faces of the joint formed with downwardly-projecting barbs on its under face, a hole in the plate through which the screw or nail fastening may be driven, and a slot with square sides extending longitudinally from one edge of the hole, and with which a squared portion of the nail or screw is adapted to engage, substantially as specified.

2. In means for securing the joints of packing-cases and the like, a plate adapted to be inserted between the faces of the joint formed with downwardly-projecting barbs on its under face, a hole in the plate through which the screw or nail fastening may be driven, and a slot with square sides extending longitudinally from each side of the hole, substantially as specified.

3. In means for securing the edges of packing-cases and the like, a plate adapted to be inserted between the faces of the joint, an elongated slot having an enlarged central portion in said plate and downwardly-projecting barbs on said plate, substantially as specified.

In testimony whereof I have signed this specification in the presence of two subscribing witnesses.

JAMES IRVINE.

Witnesses:
W. ALEXANDER,
M. A. MARCHAND.